Figure 1:
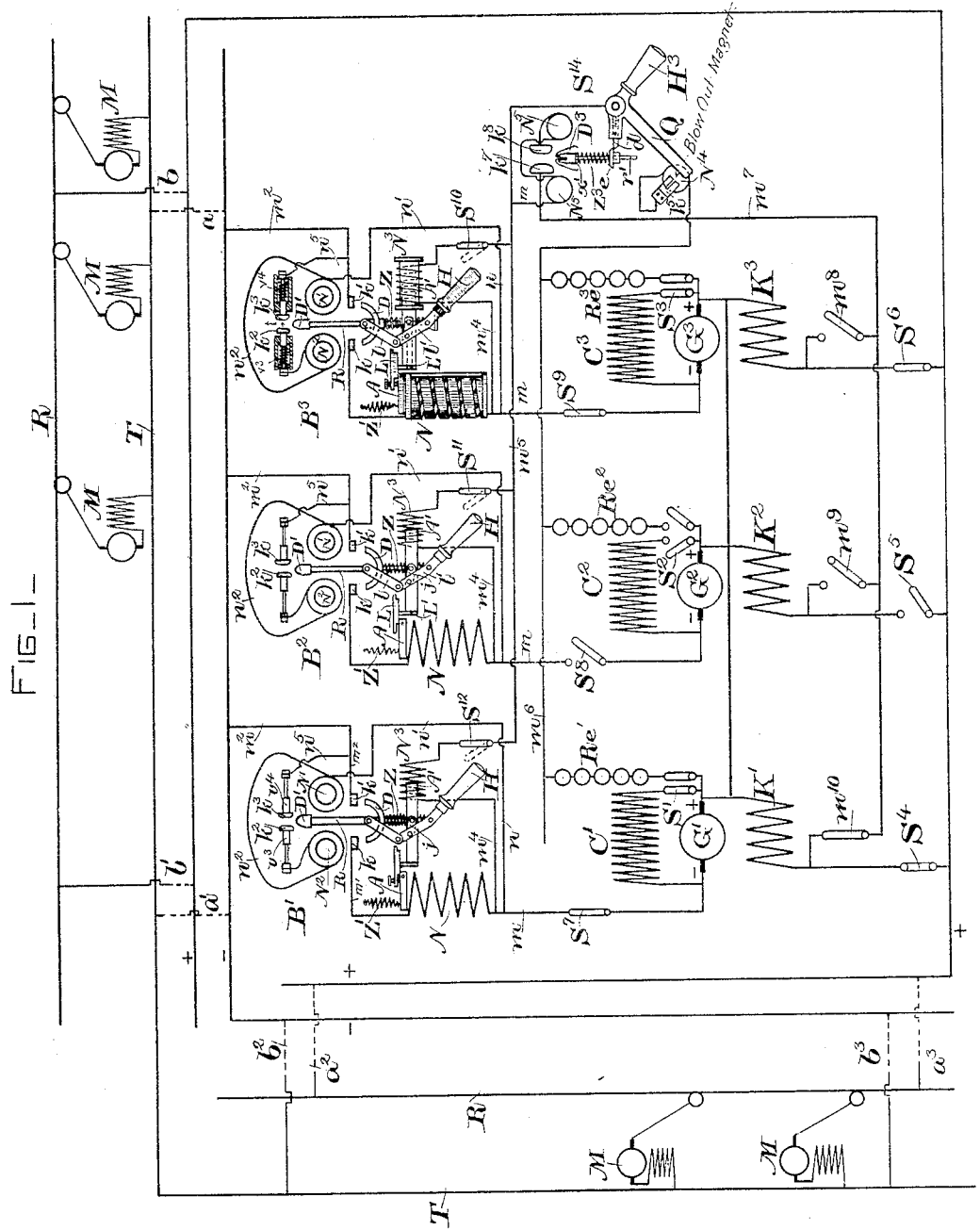

(No Model.) 2 Sheets—Sheet 1.

W. B. POTTER.
SYSTEM OF AND APPARATUS FOR CONTROLLING ELECTRIC CIRCUITS.

No. 533,083. Patented Jan. 29, 1895.

WITNESSES
Henry Westendarp
J. J. Johnston

INVENTOR
William B. Potter,
Bentley and Blodgett,
Attys (No Model.) 2 Sheets—Sheet 2.

W. B. POTTER.
SYSTEM OF AND APPARATUS FOR CONTROLLING ELECTRIC CIRCUITS.

No. 533,083. Patented Jan. 29, 1895.

WITNESSES
Henry Westendarp.
T. J. Johnston.

INVENTOR
William B. Potter,
by Bentley and Blodgett,
attys.

UNITED STATES PATENT OFFICE.

WILLIAM B. POTTER, OF LYNN, ASSIGNOR TO THE GENERAL ELECTRIC COMPANY, OF BOSTON, MASSACHUSETTS.

SYSTEM OF AND APPARATUS FOR CONTROLLING ELECTRIC CIRCUITS.

SPECIFICATION forming part of Letters Patent No. 533,083, dated January 29, 1895.

Application filed July 24, 1893. Serial No. 481,269. (No model.)

*To all whom it may concern:*

Be it known that I, WILLIAM B. POTTER, a citizen of the United States, residing at Lynn, in the county of Essex and State of Massachusetts, have invented a certain new and useful Improvement in Systems of and Apparatus for Controlling Electric Circuits, of which the following is a specification.

My invention relates to a system of and apparatus for controlling the circuits of electric generating or power stations; and consists in certain improvements in the manner of operating such controllers and, further, in improvements in their construction whereby a dynamo or group of electric machines in a station, in whose circuits the apparatus of the invention is placed, may be automatically protected against any damage which may be occasioned by the existence of short circuits in the lines, by which improvements a number of generators may also be simultaneously thrown into and out of circuit electrically or manually with the greatest facility.

The invention is applicable to the case of a single electric machine, dynamo or motor, or to any number of such machines which are required to be stopped and started together, or to the case of such machines, one or more, when their circuits are required to be automatically broken if from any cause an undue current is passing over the lines, as by an overload or short circuit existing thereon.

My invention comprises electro magnetically operated circuit-controllers, one connected in the main circuit of each machine, adapted to be released and to interrupt the circuit by the flow of a predetermined current therein, to be opened or closed manually, or to be closed by a controlling or master circuit enabling me to throw all of the machines into circuit simultaneously.

The invention will be found to be particularly useful in the generating stations of electric railway lines. When an overload on the work circuit of an electric railway line has caused the circuit controllers at the generating station to operate and cut out dynamos, it is necessary, when a number of cars are demanding current, to connect all of the machines in circuit together, as the first machine is overloaded immediately its circuit is closed and any protective device responsive to excessive current for saving a machine from injury will be actuated to maintain the circuit open.

The invention accomplishes the simultaneous operation of all the circuit controllers connecting the generators to the work circuit with safety and dispatch, and likewise protects each generator from excessive current in its own circuit.

Figure 2:
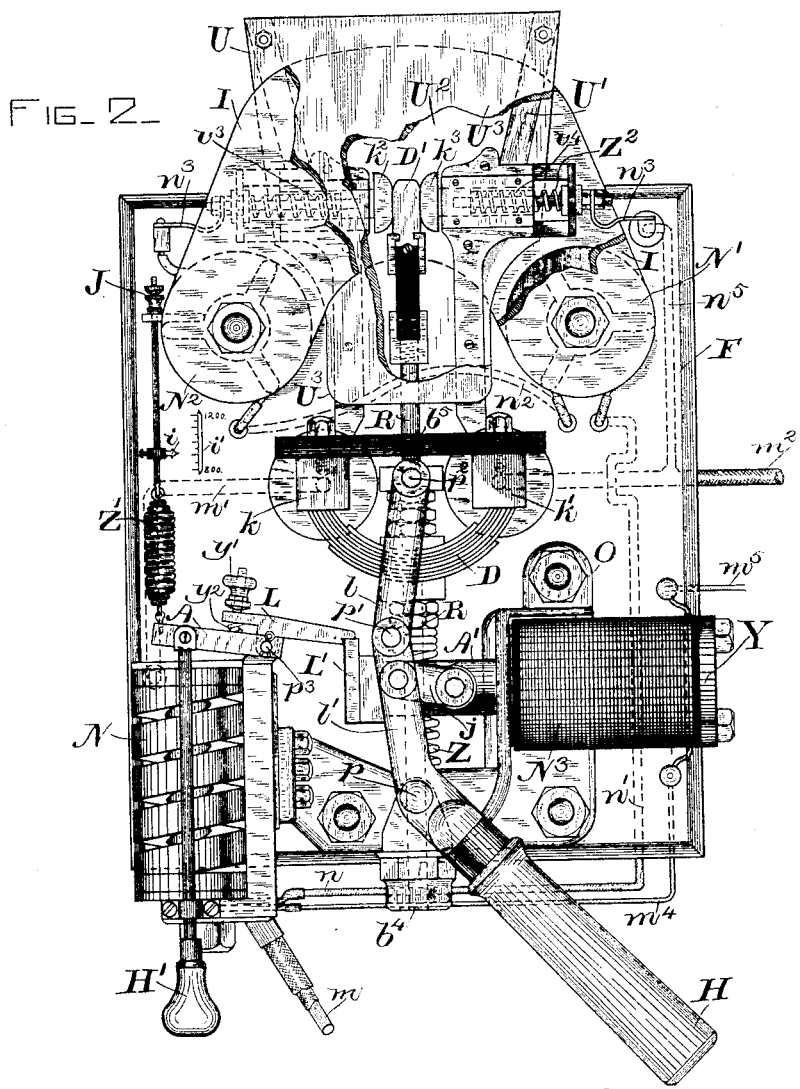
Figure 3:
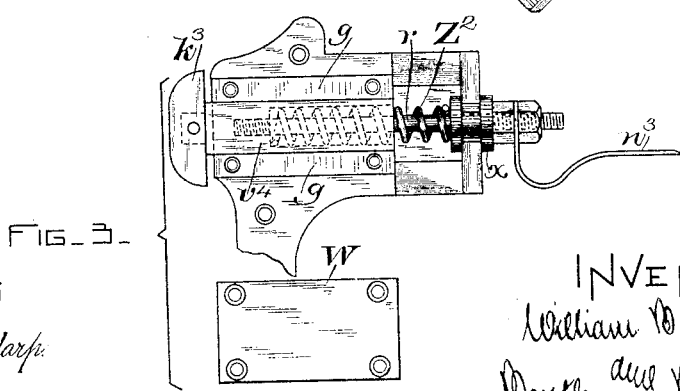

Figure 1 is a diagrammatic representation of an electric railway power station fitted with my invention. Fig. 2 is an illustration of my improved circuit controller, and Fig. 3 is a detail of the same.

In Fig. 1, $G'$ $G^2$ $G^3$ show three power generators of the direct or commuted current type, whose shunt field-magnet coils are shown at $C'$ $C^2$ $C^3$, controlled by switches $S'$ $S^2$ $S^3$; and whose series field-magnet coils are indicated at $K'$ $K^2$ $K^3$, controlled by switches $S^4$, $S^5$, $S^6$, $S^7$, $S^8$, $S^9$. The positive commutator-brushes are connected to omnibus bars marked +, and the negative commutator-brushes to omnibus bars marked —. From each omnibus bar lines $a$ $b$, $a'$ $b'$, $a^2$ $b^2$, $a^3$ $b^3$, go to the railway working conductors indicated by the letters T R for the operation of motors M M, &c. The circuit controllers $B'$ $B^2$ $B^3$, are connected, respectively, in the circuit from each of the machines $G'$ $G^2$ $G^3$, between a brush and the omnibus bar or station distribution-rail. They may be located upon either side of the commutator, but in the figure are shown as inserted in the return or negative conductor. As the connections of the circuit controllers are the same, reference is had to Fig. 2 in describing the construction, in which figure the parts are enlarged and elaborated for clearness. In this figure F is a base or frame which supports the various parts of the controller. A material not likely to become warped, and non-combustible in character, such as slate, is preferably employed for this base.

N is a magnet coil in the main circuit. As it is only required to actuate its armature A when a heavy current is flowing, and as such an armature has little work to perform, it need not be provided with an iron core. The main electrodes or terminals of the conductor from the negative brush of the generator and the line, are conducted at $k$ $k'$, respectively, and they are adapted to be bridged by a piece or pieces D, preferably made up of a number of superposed pieces of elastic and highly conducting metal, carried on a rod R and secured thereto by clamps, or nuts, as shown.

The main current enters at $m$, traverses the coil N, passes by the conductor $m'$, shown in dotted lines, to the terminal $k$, by the bridge D to terminal $k'$, and out at $m^2$ to the omnibus bar or external circuit. A shunt circuit around the electrodes $k$, $k'$, is provided by the conductor $n$, shown in full lines, $n'$ shown in dotted lines, the coils of the magnets N', N², and their intermediate connection N², shown in dotted lines, to the plunger $v^3$, the contact or bridge piece D', the plunger $v^4$ and conductor $n^5$, shown in dotted lines, to the main circuit $m^2$.

The bridging or contact pieces D, D', are insulated from each other, as shown, and are carried upon a rod R, sliding in supports or bearings at the points $b^5$, $b^4$, so that within the limit of its reciprocating motion the contact-pieces D, D', may be made to close or open the circuit between $k$, $k'$ and $k^2$, $k^3$, respectively; but the construction is such that in a downward movement of the rod R contact between $k$, $k'$ is broken before the circuit between $k^2$, $k^3$ is opened, and in an upward movement contact between $k^2$, $k^3$, is made before that between $k$, $k'$. The rod R has sleeved upon it a spring Z which tends to maintain the circuit open. The rod is adapted to be actuated by a toggle whose two arms are shown at $l$, $l'$, the part $l'$ being pivoted at $p$ to a stationary part of the apparatus, the two arms being pivoted together at $p'$, and the farther end of the armature $l$ being pivoted at $p^2$ to the rod R. The arm $l'$ is prolonged for the attachment of the handle H, used for the manual operation of the switch. The toggle is attached by a link $j$ to the armature A' of the magnet N³, which is carried by a casting O secured to the base F. This magnet N³ is preferably made of two coils or solenoids one end of which is united by a yoke Y and having two armatures A'. In the front view, Fig. 1, however, only one of the solenoids can be seen, the other lying immediately back of it in the same plane. The coils of the magnet N³ are connected at one end to the negative conductor $m^4$, and the other end leads to the point $m^5$, which corresponds to the connection going to the switch S¹⁰, Fig. 1. The armature A of the coil N is supported at one end upon a pivot $p^3$, and at its other end by a spring Z', whose power or retractive force may be adjusted by a nut J. Upon the pivot $p^3$ is also fulcrumed a detent lever L whose outer end is notched and engages, in the closed position of the switch, with the edge of a lug L' of the armature core A', a spring $y^2$ acting to keep the lever L in engagement with the lug L' and the nut $y'$ serving to adjust the amount of lost motion between the armature A and the detent L. The armature A is provided with a handle H', by means of which the armature may be pulled down by hand against the action of the spring Z'. The ends of the magnets N' N², which are seen in the figure, are of the same polarity and they are united by a yoke I, I, which is partly broken away to show the structure back of it. The other ends of these magnets are provided with another magnetic yoke corresponding in shape to the one shown, and between the facing yokes there exists a strong magnetic field when the coils N', N², are energized. The electrodes $k^2$, $k^3$, and the contact piece D' are situated in a flue or open-ended box made flaring at its upper end and narrow toward the lower end. This box is made of refractory insulating material which is capable of withstanding the high temperature of an electric arc. It is made quite shallow, preferably, allowing just enough space to permit the free movement of the parts $k^2$, $k^3$, D'. The front piece of this insulation is shown at U³, and part of it has been broken away to show the connections and the interior of the box. The back side of the box, also of insulating material, is shown at U², and the sides at U U', partly in full and partly in dotted lines.

The bridge piece D, Fig. 2 is preferably built up of a number of flat elastic metal strips, such as hard drawn copper, phosphor bronze, &c., and when forced into place with the electrodes $k$, $k'$, the ends of the strip wipe over the electrodes in sliding outward so as to make excellent contact. The springs Z², impel the electrodes $k^2$, $k^3$, into contact with the piece D', also insuring a good connection at this point, and it will be noticed that the pieces $k^2$, $k^3$, D', are separable from their supports and can be quickly detached and others substituted in their stead.

The electrodes $k^2$, $k^3$, Fig. 3, are secured to reciprocating pieces, or plungers $v^4$, running in guides $g$, $g$. The pieces, $v^4$ are chambered or drilled out for the reception of a spring Z², and a rod $r$, for supporting the spring is screwed into the piece $v^4$, as shown, the outer end of the spring bearing against the lug $z$, having an insulating bushing $x$ through which the rod $r$ passes. The outer end of the rod $r$ forms a terminal for the conductor $n^3$.

At W is shown a cover for inclosing the reciprocating piece $v^4$.

Referring again to Fig. 1, it will be seen that each of the circuit controllers B', B², B³, has one of the terminals of the magnet coils N³ connected to the negative side of the generators G', G², G³, respectively, by conductors $m^4$, and that the other terminals of these coils may be connected by switches S¹⁰, S¹¹, S¹², to a conductor $m^5$, leading to a switch S¹⁴. To this switch, also, lead two other circuits, one, $m^6$, with branches to the positive brush of each generator through resistances Re', Re², Re³, respectively, and another circuit $m^7$ leading to the positive side of each machine through branches $m^8$, $m^9$, $m^{10}$, and having practically no resistance in circuit. The circuit $m^6$, after passing through the coils of a blow-out magnet $N^4$, terminates in an electrode $k^5$, and the circuit $m^7$ goes to an electrode $k^7$ and thence, when the switch is closed, to the electrode $k^8$, the coils of blow-out magnets $N^5$ $N^5$, and to the conductor $m^5$ leading to the actuating magnets $N^3$ of the several circuit controllers. The contact piece $D^3$, of the switch $S^{14}$, is carried upon the end of a rod $r'$ upon which is a spring $Z^3$, which tends to hold the contact-piece $D^3$ out of contact, and is held between the stationary lug $x'$ and the collar or projection $e$. This collar engages a detent $d$ during part of the time when the handle $H^3$ is operated to close the switch, but the detent rides over the collar in the opposite direction of movement, the bevel on the collar and detent facilitating the motion.

Supposing all of the generators $G'$, $G^2$, $G^3$, to be connected in circuit and the automatic circuit controllers closed, as in Fig. 2, should a short circuit occur on the line or a dangerous overload exist, the armature A would be drawn downward by the main current flowing through the coils of the magnet N. This results in releasing the detent L, and the spring Z quickly throws the parts to the position shown in $B^3$, Fig. 1. The circuit is first broken at the points $k$, $k'$, and the current then finds a path through the shunt circuit around the electrodes $k$, $k'$, thus, from $m^2$ via $n^5$, $v^4$, $k^3$, $D'$, $k^2$, $v^3$, $N^2$, $n^2$, $N'$, $n'$, $n$ to $m$, the current so diverted energizing the magnets $N'$, $N^2$. A further movement of the rod R then opens the circuit at $D'$ and the arc is instantly extinguished, the direction of the winding of the coils $N'$, $N^2$ being made such as will expel the arc outward. The arc existing in a confined space is powerfully acted upon by the strong magnetic field in which it exists, and the apparatus will, it is found in practice, easily break circuits of five hundred volts potential and twelve hundred to two thousand or more ampères, and this in a comparatively quiet manner, as distinguished from the roaring and prodigious arcs which have been heretofore present when circuits conveying currents of such high potential and arge volumes are interrupted.

A short circuit between the mains T R, following a static discharge or overload of the working devices between these mains will cause the circuit controllers $B'$, $B^2$, $B^3$, to operate.

The short circuit or overload having been removed from the line and the generators $G'$, $G^2$, $G^3$, running at normal speed, the attendant, to again simultaneously connect all the generators in circuit, throws the switch handle $H^3$ so that the arm Q makes contact with the electrode $k^5$, and current from the positive brush of each machine which is to be thrown into circuit now flows through the resistances R$e'$, &c., conductor $m^6$, magnet $N^4$, contact $k^5$, arm Q, conductor $m^5$, and through the magnets $N^3$ of each of the circuit controllers in multiple and through the conductor $m^4$ to the negative mains or conductors of the respective generators. The magnets $N^3$ are thus energized and attract their armatures or cores $A'$, approaching the bridging piece or brush D to the electrodes $k$, $k'$. At this instant the bridging piece $D^3$, borne upon the rod $r'$, which has been advanced by the detent $d$ engaging with the collar $e$, now connects the electrodes $k^7$, $k^8$, and the full generated potential of, say, five hundred volts, in the case of railway work, passes through the coils of the magnets $N^3$ by the path $m^7$, $k^7$, $D^3$, $k^8$, coils $N^5$, to $m^5$ with no resistance in circuit and the solenoid cores are attracted with great power, while the toggle levers $l$, $l'$, are nearly in line or in their most effective position to exert great pressure upon the bridge D, which is now forced against the electrodes $k$, $k'$, hard enough to make such a contact as will carry the large current to be conveyed, the strips being given a sliding or wiping motion outward under this pressure, as stated, to keep the contact surfaces clean. The direct connection of the coils $N^3$ in circuit between the positive and negative brushes of the generators by the contact piece $D^3$ bridging the electrodes $k^7$, $k^8$, is but momentary, as a continued movement of the handle $H^3$ in closing the switch $S^{14}$ releases the detent $d$ from its engagement with the collar $e$, and the spring $Z^3$ opens this circuit. In the closing movement of the circuit-controller the contact-piece $D'$ connects the electrodes $k^2$, $k^3$, an instant before the bridge D makes contact with the electrodes $k$, $k'$, and thus injury to the meeting surfaces of $D$, $k$, $k'$, at the instant when initial contact is made is prevented. Thus in making or breaking the circuit the brunt of the arc is confined to the points $k^2$, $D'$, $k^3$, which, as stated, are easily removed and replaced by a new piece, when so injured by arcing that they can be no longer effectively used. The magnets $N^4$, $N^5$ act to blow out arcs which may form at the electrodes near thereto.

When the handle H, of the switch $S^{14}$, is operated as just described to close the circuit breakers the arm Q may be kept in contact with the contact $k^5$ and will keep the circuit through the several coils $N^3$, and the resistances R$e$, &c., closed and the armatures $A'$ in their attracted position. It is sometimes useful or necessary to keep the circuit breakers closed even when such an overload exists upon the circuit as would cause them to open the circuit automatically. The switch $S^{14}$ affords ready means of doing this, and the operator is able to determine by observation of the apparatus what overload may be safely carried for a short time.

In Fig. 2, an index $i$ is secured by a set-screw $y$ to the rod $r^2$, and reciprocates over the scale $i'$. By adjusting the pull of the spring $Z'$ by means of the nut J, and the position of the index upon the rod, the circuit breaking magnet may be made to act by a predetermined current, and the calibration may be made with great nicety.

Having thus described my invention, what I claim as new, and wish to protect by Letters Patent of the United States, is—

1. A plurality of dynamo-electric machines each provided with a circuit-controller, and a series of electro-magnetic resetting devices for such circuit-controllers actuated by a common circuit.

2. In a system of electric distribution, the combination with a plurality of dynamo-electric machines, of electrically operated circuit-controlling switches, one in the circuit of each machine, magnets adapted to operate said switches having coils connected to a common controlling circuit, a switch adapted to control such common circuit and switches arranged to connect any of such magnets in a local controlling circuit at will.

3. In a system of electric distribution, the combination, with a dynamo-electric generator, of a circuit-controller adapted to connect such generator in a work circuit or disconnect it therefrom, such controller comprising a coil carrying the main current and adapted to open the circuit of the generator upon the flow of abnormal current therein, a magnet arranged to operate the circuit controller and close the circuit of such generator, a retractive device opposing the pull of the magnet, and an electric switch in the circuit of such magnet.

4. The combination of a coil conveying the main current, mechanism controlled thereby adapted to open a main circuit switch, a magnet arranged to close such switch, and an armature connected to the switch and actuated by the magnet adapted to engage the releasing mechanism when the switch is closed.

5. In an electric circuit controller, a main switch, an auxiliary switch in shunt thereto provided with a magnetic arc-disrupter and arranged to open after the main switch by the same movement of the operating handle, and a coil in series in the main circuit adapted to open the switch by the passage of abnormal current, substantially as described herein.

6. In an electric circuit-controller, switching apparatus adapted to open the circuit, a series coil in the main circuit, an armature attracted by the coil and adapted to release the switching mechanism, and an adjustable spring arranged to vary the pull upon the armature; whereby the effect of the series coil may be predetermined and the circuit may be opened by a definite excess of current.

7. In an electric circuit-controller, a switching mechanism adapted to open the main circuit, a series coil adapted to actuate such switching mechanism, an armature actuated by such series coil against the pull of an adjustable spring, an index connected to such spring and reciprocating over a scale, substantially as herein described; whereby the switching mechanism may be released upon a previously determined excess of current.

8. In an electric circuit-controller, switching mechanism adapted to open the main circuit, a series coil in such main circuit, an armature actuated by such series coil and carrying a detent lever adjustable toward or away from such armature and engaging with a lug arranged to prevent the operation of the switch; whereby the adjustment of the detent lever may be made more or less delicate, as required.

9. A circuit controlling mechanism comprising a main switch carried upon the same rod with an auxiliary switch in shunt thereto and arranged to break contact before such auxiliary switch, the auxiliary switch being provided with an arc-disrupter and removable contacts.

10. An electric circuit-controller comprising a main switch carried upon the same rod with an auxiliary switch in shunt thereto and arranged to open before such auxiliary switch, the rod being operated by a spring adapted to open the contacts and by a toggle adapted to close such contacts, the toggle being connected to an electro-magnetically operated apparatus.

11. In a circuit-controlling apparatus, the combination of a main switch comprising contact terminals and a bridge piece adapted to make sliding contact therewith, an auxiliary switch in shunt to such main switch and provided with an arc-disrupting device, the main switch being adapted to open before the auxiliary switch and the two switches being carried upon the same rod, a spring adapted to open such switches, and a detent actuated by a series coil in the main circuit arranged to hold the switches closed until a predetermined excess of current in the series coil releases the detent and opens the circuit.

12. In an electric circuit-controller, a main switch comprising contacts and a flexible bridging piece operated by a toggle connected to an electro-magnetic apparatus; whereby the contact of the bridging piece is affected at the point of greatest power of the toggle when the electro-magnetic apparatus is also in position to exert the greatest pull.

13. In a system of electric distribution, a switch provided with double contact blades, separate circuits running to such blades, one of such circuits taking current through a resistance and the other circuit arranged to momentarily pass full current, substantially as herein set out.

14. In a system of electric distribution, a plurality of generators provided with circuit-controlling switches adapted to be closed by electro-magnetic mechanisms and a switch, substantially as herein described, adapted to pass current through a resistance in series with such electro-magnetic switch-closing mechanisms and then to momentarily pass the full current therethrough.

15. In a system of electric distribution, a plurality of generators provided with circuit controllers adapted to be closed by electro-magnetic mechanisms, multiple circuits passing from the generators to such mechanism, one of such circuits including resistances and the other carrying the full current and a switch adapted to close such circuits successively and by a further movement to suddenly break the circuit carrying the full current.

16. A switching mechanism provided with double contacts, one of such contacts arranged to carry the current from a circuit including a resistance and the second contact arranged to make, and by a further movement of the switch handle to break, a circuit carrying full current, substantially as set out and described herein.

In witness whereof I have hereunto set my hand this 21st day of July, 1893.

WILLIAM B. POTTER.

Witnesses:
  JOHN W. GIBBONEY,
  BENJAMIN B. HULL.